(12) United States Patent
Wu et al.

(10) Patent No.: US 10,643,612 B2
(45) Date of Patent: May 5, 2020

(54) METHOD AND APPARATUS FOR CONTROLLING THE PLAYING OF MULTIMEDIA CONTENT

(71) Applicant: Baidu Online Network Technology (Beijing) Co., Ltd., Beijing (CN)

(72) Inventors: Wei Wu, Beijing (CN); Jiafeng Wang, Beijing (CN); Junnan Luo, Beijing (CN); Zhenghao Jiang, Beijing (CN); Jing Li, Beijing (CN); Yue Liu, Beijing (CN); Fei Wang, Beijing (CN); Yan Zhang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 127 days.

(21) Appl. No.: 15/979,174

(22) Filed: May 14, 2018

(65) Prior Publication Data
US 2019/0295543 A1     Sep. 26, 2019

(30) Foreign Application Priority Data
Mar. 20, 2018 (CN) .......................... 2018 1 0231476

(51) Int. Cl.
*G10L 15/22* (2006.01)
*H04L 29/08* (2006.01)
(Continued)

(52) U.S. Cl.
CPC .............. *G10L 15/22* (2013.01); *G06F 3/165* (2013.01); *G06F 16/44* (2019.01); *G06F 16/48* (2019.01);
(Continued)

(58) Field of Classification Search
CPC ......... G10L 15/22; G10L 25/51; G10L 15/08; G10L 2015/223; G10L 2015/088;
(Continued)

(56) References Cited

U.S. PATENT DOCUMENTS 8,180,904 B1 * 5/2012 Albanese ............ H04L 12/5692
709/228
9,400,875 B1 * 7/2016 Barraclough ........... G06F 21/10
(Continued)

FOREIGN PATENT DOCUMENTS

CN          101360234 A       2/2009
CN          103945265 A       7/2014
(Continued)

*Primary Examiner* — Edwin S Leland, III
(74) *Attorney, Agent, or Firm* — Seed IP Law Group LLP

(57) ABSTRACT

Embodiments of the present disclosure disclose a method and apparatus for playing multimedia content. A specific embodiment of the method includes: recognizing a voice signal to obtain corresponding voice information, in response to detecting the voice signal sent by a user according to guidance information of a presented current multimedia content; matching the voice information with template information corresponding to the guidance information as acquired; and generating a command to execute an operation to skip playing the current multimedia content, in response to determining successful matching the voice information and the template information corresponding to the guidance information. This embodiment realizes the improvement of the multimedia content acquisition efficiency.

15 Claims, 5 Drawing Sheets

(51) Int. Cl.

| | | |
|---|---|---|
| *G10L 25/51* | (2013.01) | |
| *G06F 3/16* | (2006.01) | |
| *G10L 15/08* | (2006.01) | |
| *H04L 29/06* | (2006.01) | |
| *G06F 16/44* | (2019.01) | |
| *G06F 16/48* | (2019.01) | |
| *H04N 21/422* | (2011.01) | |
| *H04N 21/439* | (2011.01) | |
| *H04N 21/6587* | (2011.01) | |
| *H04N 21/2387* | (2011.01) | |
| *H04N 21/234* | (2011.01) | |
| *H04N 21/44* | (2011.01) | |
| *H04N 21/81* | (2011.01) | |
| *H04N 21/431* | (2011.01) | |
| *H04N 21/218* | (2011.01) | |
| *H04N 21/233* | (2011.01) | |
| *H04N 21/258* | (2011.01) | |

(52) U.S. Cl.
CPC .............. *G10L 15/08* (2013.01); *G10L 25/51* (2013.01); *H04L 63/0861* (2013.01); *H04L 67/306* (2013.01); *H04N 21/218* (2013.01); *H04N 21/233* (2013.01); *H04N 21/2387* (2013.01); *H04N 21/23418* (2013.01); *H04N 21/25816* (2013.01); *H04N 21/42203* (2013.01); *H04N 21/4316* (2013.01); *H04N 21/4394* (2013.01); *H04N 21/44008* (2013.01); *H04N 21/6587* (2013.01); *H04N 21/812* (2013.01); *H04N 21/8126* (2013.01); *G10L 2015/088* (2013.01); *G10L 2015/223* (2013.01); *H04L 67/10* (2013.01)

(58) Field of Classification Search
CPC ........... H04N 21/25816; H04N 21/233; H04N 21/218; H04N 21/4316; H04N 21/8126; H04N 21/812; H04N 21/44008; H04N 21/23418; H04N 21/2387; H04N 21/6587; H04N 21/4394; H04N 21/42203; H04N 21/8405; H04N 21/4882; H04N 21/439; H04N 21/42204; H04N 21/25875; H04L 67/306; H04L 63/0861; H04L 67/10; G06F 3/165; G06F 16/48; G06F 16/44
USPC ........................................................ 704/235
See application file for complete search history.

(56) References Cited

U.S. PATENT DOCUMENTS

| | | | | |
|---|---|---|---|---|
| 9,876,848 | B1 * | 1/2018 | Carroll | ............... G06K 9/00536 |
| 2008/0287100 | A1 * | 11/2008 | Satheesh | ................. H04M 3/02 |
| | | | | 455/411 |
| 2016/0063533 | A1 | 3/2016 | Shmueli et al. | |
| 2019/0295543 | A1 * | 9/2019 | Wu | ..................... H04N 21/8126 |
| 2019/0377932 | A1 * | 12/2019 | Alameh | ........... H04N 21/41407 |
| 2019/0384562 | A1 * | 12/2019 | Jannace | ................ G06F 3/0482 |

FOREIGN PATENT DOCUMENTS

| | | |
|---|---|---|
| CN | 107071542 A | 8/2017 |
| CN | 107659847 A | 2/2018 |
| JP | 2004-120324 A | 4/2004 |
| JP | 2007-322836 A | 12/2007 |
| JP | 2016-52130 A | 4/2016 |

\* cited by examiner

METHOD AND APPARATUS FOR CONTROLLING THE PLAYING OF MULTIMEDIA CONTENT

CROSS-REFERENCE TO RELATED APPLICATIONS

This application is related to and claims the priority from Chinese Application No. 201810231476.4, filed on Mar. 20, 2018, entitled "Method and Apparatus for Playing Multimedia Content," the entire disclosure of which is incorporated herein by reference.

TECHNICAL FIELD

Embodiments of the present disclosure relate to the field of computer technology, specifically relate to the field of Internet technology, and more specifically relate to a method and apparatus for playing multimedia content.

BACKGROUND

As the computer technology develops and the user demand for diversified content acquisition methods increases, more and more multimedia contents have been produced. Generally, intelligent electronic devices may play multimedia contents in the network according to the user selection, proactively push some multimedia contents to the user, or combine the proactively pushed multimedia contents and the multimedia contents selected by the user into a multimedia content collection, and sequentially play the multimedia contents in the collection.

Contemporary multimedia content playback services play certain pushed multimedia contents before playing the multimedia contents selected by the user. Even if the user is not interested in the pushed multimedia contents, she needs to wait for the end of the playback of the pushed multimedia contents. However, while waiting, the user usually does not pay attention to the pushed multimedia contents. The user may alternatively purchase a play-skip service to directly skip the playback of the pushed multimedia contents, resulting in information of the pushed multimedia contents being unable to be delivered to the user quickly and efficiently.

SUMMARY

Embodiments of the present disclosure provides a method and apparatus for playing multimedia content.

In a first aspect, the embodiments of the present disclosure provides a method for playing multimedia content, including: recognizing a voice signal to obtain corresponding voice information, in response to detecting the voice signal sent by a user according to guidance information of a presented current multimedia content; matching the voice information with template information corresponding to the guidance information as acquired; and generating a command to execute an operation to skip playing the current multimedia content, in response to determining successful matching the voice information and the template information corresponding to the guidance information.

In some embodiments, the method further includes: acquiring play configuration information of the current multimedia content, the play configuration information including the guidance information of the current multimedia content, presentation mode information of the guidance information and the template information corresponding to the guidance information.

In some embodiments, the guidance information is used to guide the user to send a voice instruction to skip playing the current multimedia content, and the template information includes a template instruction; the recognizing the voice signal to obtain corresponding voice information, includes: converting the voice signal into a corresponding user instruction text; and the matching the voice information with template information corresponding to the guidance information as acquired, includes: matching the user instruction text semantically with the template instruction corresponding to the guidance information as acquired.

In some embodiments, the guidance information and the template information corresponding to the guidance information include guidance information and template information determined through a following approach: analyzing the current multimedia content based on a preset multimedia content library to extract a key sentence contained in the multimedia content; defining the key sentence as the template information; and acquiring corresponding guidance information configured for the key sentence.

In some embodiments, the preset multimedia content library includes a plurality of multimedia contents having key content identifiers; and the analyzing the current multimedia content based on a preset multimedia content library to extract a key sentence contained in the multimedia content includes: extracting a plurality of candidate sentences from a text content of the current multimedia content; determining a multimedia content having an identical key content identifier to the current multimedia content in the preset multimedia content library as an associated multimedia content of the current multimedia content; determining a multimedia content having a different key content identifier from the current multimedia content in the preset multimedia content library as a non-associated multimedia content of the current multimedia content; determining a number of the associated multimedia contents containing each candidate sentence and a number of the non-associated multimedia contents containing each candidate sentence; and determining the key sentence of the current multimedia content from the candidate sentences according to the number of the associated multimedia contents and the number of the non-associated multimedia contents containing each candidate sentence.

In some embodiments, the recognizing a voice signal to obtain corresponding voice information, in response to detecting the voice signal sent by a user according to guidance information of a presented current multimedia content, includes: verifying a legitimacy of the voice signal, in response to detecting the voice signal sent by the user according to the guidance information; and recognizing the voice signal by voice to obtain the corresponding voice information, in response to passing the verifying a legitimacy of the voice signal, voice-.

In some embodiments, the verifying a legitimacy of the voice signal, in response to detecting the voice signal sent by the user according to the guidance information, includes: acquiring security authentication information of a playback device and a user account used by the user for viewing the current multimedia content, in response to detecting the voice signal sent by the user according to the guidance information; authenticating the security authentication information of the playback device and the security authentication information of the user account; and determining the verification of the legitimacy of the voice signal, in response passing the authenticating the security authentication information of the playback device and the security authentication information of the user account.

In some embodiments, the method further includes: generating first prompt information for prompting the user of successfully skipped the played current multimedia content, in response to determining successful matching the voice information and the template information corresponding to the guidance information.

In some embodiments, the method further includes: generating second prompt information for prompting the user of not successfully skipping the played current multimedia content, in response to determining unsuccessful matching the voice information and the template information corresponding to the guidance information.

In a second aspect, the embodiments of the present disclosure provides an apparatus for playing multimedia content, including: a recognition unit, configured to recognize a voice signal to obtain corresponding voice information, in response to detecting the voice signal sent by a user according to guidance information of a presented current multimedia content; a matching unit, configured to match the voice information with template information corresponding to the guidance information as acquired; and a generation unit, configured to generate a command to execute an operation to skip playing the current multimedia content, in response to determining successful matching the voice information and the template information corresponding to the guidance information.

In some embodiments, the apparatus further includes: an acquisition unit, configured to acquire play configuration information of the current multimedia content, the play configuration information including the guidance information of the current multimedia content, presentation mode information of the guidance information and the template information corresponding to the guidance information.

In some embodiments, the guidance information is used to guide the user to send a voice instruction to skip playing the current multimedia content, and the template information includes a template instruction; the recognition unit is further configured to recognize the voice signal to obtain corresponding voice information through a following approach: convert the voice signal into a corresponding user instruction text; and the matching unit is further configured to match the voice information with template information corresponding to the guidance information as acquired through a following approach: match the user instruction text semantically with the template instruction corresponding to the guidance information as acquired.

In some embodiments, the guidance information and the template information corresponding to the guidance information include guidance information and template information determined through a following approach: analyzing the current multimedia content based on a preset multimedia content library to extract a key sentence contained in the multimedia content; defining the key sentence as the template information; and acquiring corresponding guidance information configured for the key sentence.

In some embodiments, the preset multimedia content library includes a plurality of multimedia contents having key content identifiers; and a key sentence as the template information is extracted through a following approach: extracting a plurality of candidate sentences from a text content of the current multimedia content; determining a multimedia content having an identical key content identifier to the current multimedia content in the preset multimedia content library as an associated multimedia content of the current multimedia content; determining a multimedia content having a different key content identifier from the current multimedia content in the preset multimedia content library as a non-associated multimedia content of the current multimedia content; determining a number of the associated multimedia contents containing each candidate sentence and a number of the non-associated multimedia contents containing each candidate sentence; and determining the key sentence of the current multimedia content from the candidate sentences according to the number of the associated multimedia contents and the number of the non-associated multimedia contents containing each candidate sentence.

In some embodiments, the recognition unit is further configured to recognize the voice signal by voice to obtain corresponding voice information through a following approach: verify a legitimacy of the voice signal, in response to detecting the voice signal sent by the user according to the guidance information; and recognize the voice signal by voice to obtain the corresponding voice information, in response to passing the verifying of a legitimacy of the voice signal.

In some embodiments, the recognition unit is further configured to verify a legitimacy of the voice signal through a following approach: acquire security authentication information of a playback device and a user account used by the user for viewing the current multimedia content, in response to detecting the voice signal sent by the user according to the guidance information; authenticate the security authentication information of the playback device and the security authentication information of the user account; and determine the verification of the legitimacy of the voice signal, in response to passing the authenticating the security authentication information of the playback device and the security authentication information of the user account.

In some embodiments, the apparatus further includes: a first prompt unit, configured to generate first prompt information for prompting the user of successfully skipping the played current multimedia content, in response to determining successful matching the voice information and the template information corresponding to the guidance information.

In some embodiments, the apparatus further includes: a second prompt unit, configured to generate second prompt information for prompting the user of not successfully skipping the played current multimedia content, in response to determining unsuccessful matching the voice information and the template information corresponding to the guidance information.

In a third aspect, the embodiments of the present disclosure provides an electronic device, including: one or more processors; and a storage apparatus, to store one or more programs, and when the one or more programs being executed by the one or more processors, cause the one or more processors to implement the method for playing multimedia content as provided in the first aspect.

In a fourth aspect, the embodiments of the present disclosure provides a computer readable storage medium, storing a computer program thereon, the computer program, when executed by a processor, implements the method for playing multimedia content as provided in the first aspect.

By recognizing a voice signal to obtain corresponding voice information, in response to detecting the voice signal sent by a user according to guidance information of a presented current multimedia content; then matching the voice information with template information corresponding to the guidance information as acquired; and generating a command to execute an operation to skip playing the current multimedia content, in response to determining successful matching the voice information and the template information corresponding to the guidance information, the method and apparatus for playing multimedia content of the above embodiments of the present disclosure realizes the improvement of the multimedia content acquisition efficiency.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
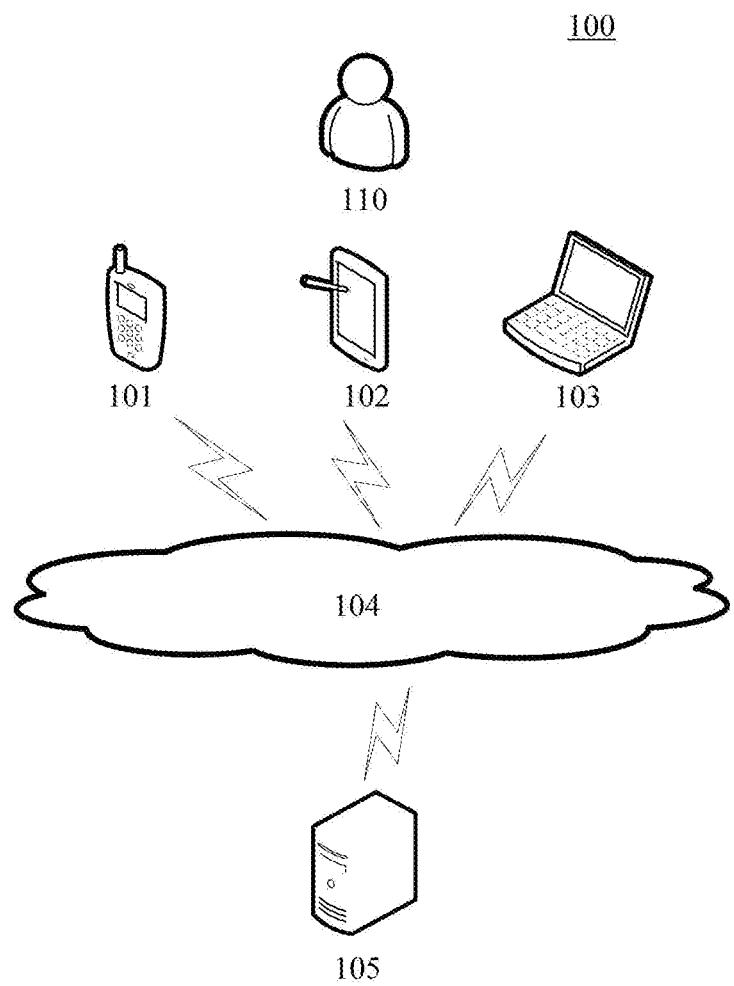
FIG. 1 is an exemplary system architecture diagram in which the present disclosure may be applied.

FIG. 1 illustrates an exemplary system architecture 100 to which the method for playing multimedia content or the apparatus for playing multimedia content according to an embodiment of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to receive or transmit messages, etc. Various multimedia playback applications, such as video playback clients, audio playback clients, picture viewers, and text readers may be installed on the terminal devices 101, 102 and 103.

The terminal devices 101, 102 and 103 may be various electronic devices having displays and supporting internet access, including but not limited to, smart phones, tablet computers, smart watches, laptop computers, laptop portable computers, e-book readers, etc.

The server 105 may be a multimedia content playback server that provides support for a multimedia content playback service. The multimedia content playback server may receive a multimedia content playback request sent by the terminal devices 101, 102 and 103, analyze the multimedia content playback request, find corresponding multimedia content according to an analyzing result, and feedback the found multimedia content to the terminal devices 101, 102 and 103.

It needs to be noted that the method for playing multimedia content provided by the embodiments of the present disclosure may be executed by the terminal devices 101, 102, 103 or the server 105. Accordingly, the apparatus for playing multimedia content may be provided in the terminal devices 101, 102, 103, or in the server 105.

It needs to be noted that the server may be hardware or software. When the server is hardware, it may be implemented as a distributed server cluster composed of multiple servers, or maybe implemented as a single server. When the server is software, it may be implemented as multiple software or software modules (e.g., multiple software modules used to provide distributed services), or may be implemented as a single software or software module. The present disclosure does not impose any specific limitations thereof.

It should be understood that the numbers of the terminal devices, the networks and the servers in FIG. 1 are merely illustrative. Any number of terminal devices, networks and servers may be provided based on the implementation requirements.

Figure 2:
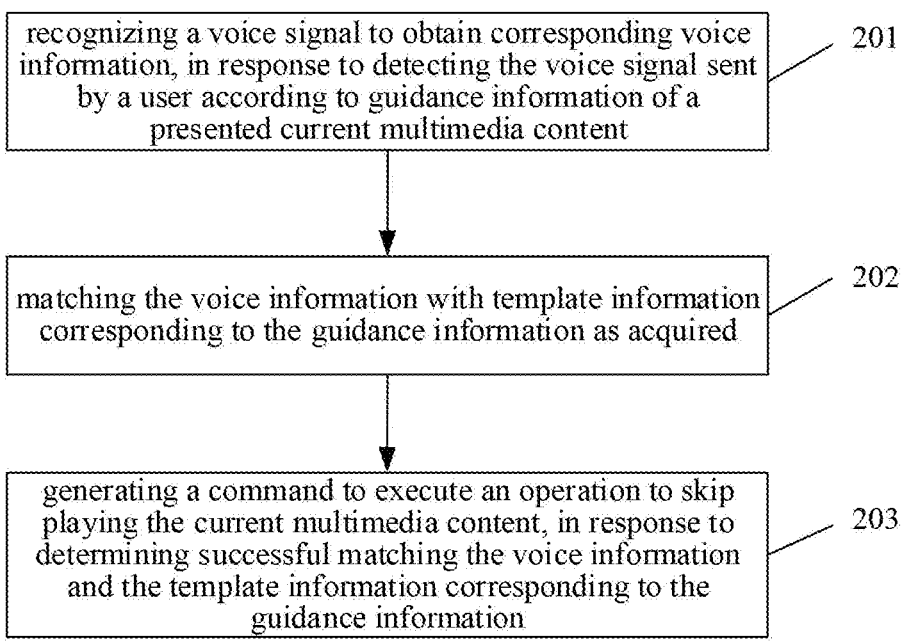
FIG. 2 is a flowchart of an embodiment of a method for playing multimedia content according to the present disclosure.

With further reference to FIG. 2, a flow 200 of an embodiment of the method for playing multimedia content according to the present disclosure is shown. The method for playing multimedia content includes the following steps:

In step 201, a voice signal is recognized to obtain corresponding voice information, in response to detecting the voice signal sent by a user according to guidance information of a presented current multimedia content.

In the present embodiment, the executive body of the method for playing multimedia content (for example, the terminal devices 101, 102, 103 or the server 105 as shown in FIG. 1) may detect whether a voice signal sent by the user is received, and determine whether the voice signal is sent according to guidance information of a presented current multimedia content. Here, the guidance information may be information used to guide the user to execute a specific operation. The current multimedia content is the multimedia content currently being played. Multimedia content may include but is not limited to: videos, audios, pictures, and texts. Specifically, the above executive body may present the guidance information in an interface playing the current multimedia content, and continuously detect whether a voice signal sent by the user is received during the presentation of the guidance information. For example, the guidance information may be presented for 5 seconds, then the executive body may continuously detect within the 5 seconds of the presentation of the guidance information whether the user sends the voice signal.

When the above executive body is a client playing the current multimedia content, the client may capture the voice signal sent by the user through an audio input interface after presenting the guidance information of the current multimedia. The client may also capture the voice signal sent by the user and then immediately report the voice signal of the user to a server providing the multimedia content playback service. When the above executive body is the server for providing the multimedia content playback service, the server may detect whether the voice signal sent by the user is received from the client playing the current multimedia content.

After detecting the voice signal sent by the user according to the guidance information of the presented current multimedia content, the voice signal may be analyzed to recognize voice information corresponding to the voice signal. Here, the voice information may include: information for characterizing the voice characteristic of the voice signal and/or information for characterizing the semantics contained in the voice signal.

In a specific implementation, the voice signal sent by the user maybe input into a trained voice information recognition model to obtain the corresponding voice information. Here, the voice information recognition model may be obtained by training by adopting machine learning methods, based on a marking result of a preset sample voice signal and voice information corresponding to the sample voice signal. In practice, the voice information recognition result of the sample voice signal may be marked. The voice information corresponding to the sample voice signal is predicted using the voice information recognition model to be trained. Then, parameters of the voice information recognition model to be trained are iteratively adjusted according to a difference between a prediction result of the voice information recognition model and the marking result of the sample voice signal. When the difference between the prediction result of the voice information recognition model and the marking result of the sample voice signal satisfies a preset condition, the iteration is stopped, and a trained voice information recognition model is obtained.

In another specific implementation, a pre-constructed semantic model may be used to recognize the voice signal sent by the user. The semantic model may characterize the relationship between the voice signal after voice frames are divided and the corresponding semantic information, and may be constructed based on a semantic analysis to sample sentences of large amounts of data. The above executive body may use the semantic model to directly analyze to obtain the semantic information corresponding to the voice signal, and use an existing audio feature extraction method to extract sound features of the voice signal from the voice signal as the recognition result of the voice signal.

The above executive body may locally execute the recognition operation of the voice signal, or may report the detected voice signal to a voice server. For example, the executive body may report to the voice server in a binary stream form and then receive a voice recognition result of the voice server to the binary voice stream. The recognition result of the voice signal sent by the user is the corresponding voice information.

The above guidance information may be pre-configured for the multimedia content. In practice, each multimedia content may be configured with multiple guidance information, and the above executive body may acquire the guidance information of the multimedia content in advance and present the information when playing the multimedia content.

In an actual scenario, when the user views a played multimedia content, pre-configured guidance information may be presented on the playback interface. The guidance information is used to inform the user to skip the played current multimedia content by sending a corresponding voice instruction. For example, a prompt "say XXX to skip this video" may be presented on the playback interface for the user while a certain video clip is played. After receiving the guidance information, the user may send a corresponding voice signal to request to skip playing the current video clip. Or, when the user listens to the news, audio guidance information of the news currently played may be broadcasted to the user through the audio output interface. The user may send a voice signal after receiving the guidance information. The device playing the video or audio may detect the voice signal of the user, and may send the voice signal to the server to convert it to the corresponding voice information.

In some alternative implementations of the present embodiment, the above guidance information may be used to guide the user to send a voice instruction to skip playing the current multimedia content. The template information may include a template instruction, and the template instruction may be used to indicate the execution of an operation to skip playing the current multimedia content. At this time, the voice signal may be recognized to obtain the corresponding voice information by the following method: converting the voice signal into a corresponding user instruction text. Specifically, the voice signal may be recognized according to the following method: first, perform acoustic feature extraction and voice state segmentation to the waveform of the voice signal to obtain the acoustic feature and the voice state segmentation result of the voice signal; then, estimate the voice state segmentation result based on an acoustic model, specifically, the voice state segmentation result may be matched with each phoneme in the acoustic model; and then, combine the phonemes obtained from the matching of the acoustic model using a language model into a recognition result that conforms to the syntactic structure.

In step 202, the voice information is matched with template information corresponding to the guidance information as acquired.

Each guidance information is configured with corresponding template information. In the present embodiment, the recognized voice information may be matched with template information corresponding to the guidance information. Here, the matching degree between the voice information and the template information may be directly calculated, the semantics contained in the voice information may also be matched with the semantics of the template information, and the voice feature information contained in the voice information may also be matched with the voice feature information contained in the template information.

In some alternative implementations of the present embodiment, the template information may include a template instruction, and the template instruction may be used to indicate the execution of the operation to skip playing the current multimedia content. At the same time, the guidance information presented in step 201 is used to guide the user to send a voice instruction to skip playing the current multimedia content, and in step 201, the voice signal is recognized by converting the voice signal into a corresponding user instruction text. Here, the user instruction text may be matched semantically with the template instruction corresponding to the acquired guidance information to realize the matching of the voice information and the template information corresponding to the acquired guidance information. Here, the template instruction may be a pre-configured text instruction. The semantic matching between the user instruction text and the template instruction corresponding to the acquired guidance information may be used to determine whether the condition for skipping playing the current multimedia content is satisfied.

A plurality of methods may be adopted to match semantically the user instruction text and the template instruction corresponding to the acquired guidance information. An optional matching method is to directly match text contents of the user instruction text and the template instruction corresponding to the above guidance information. When the matching degree exceeds a preset matching degree threshold, it maybe determined that the semantics of both sides are consistent, that is, the semantic matching of the user instruction text and the template instruction corresponding to the guidance information is successful, otherwise it may be determined that the semantic matching of both sides fails. Another optional matching method may be matching the semantics of both sides by adopting a natural language processing method. Specifically, the recognized user instruction text obtained in step 201 and the template instruction corresponding to the guidance information of the acquired current multimedia content may be semantically analyzed to determine whether the semantics of both sides match.

Specifically, when the above user instruction text is matched semantically with the above template instruction by adopting the natural language processing method, the user instruction text and the template instruction may first be segmented into words. The language model is used to convert the user instruction text and the template instruction into vectors, and the converted vectors are used to calculate the similarity between the user instruction text and the template instruction. A trained deep neural network may also be used to calculate the matching degree between the user instruction text and the template instruction. The trained deep neural network may be obtained by training based on sample texts with labeled semantic matching results.

In step 203, a command is generated to execute an operation to skip playing the current multimedia content, in response to determining successful matching the voice information and the template information corresponding to the guidance information.

If the matching of the voice information corresponding to the voice signal of the user and the template information corresponding to the guidance information in step 202 is successful, it may be determined that the condition for skipping playing the current multimedia content is satisfied, and the executive body may generate a command to execute skipping playing the current multimedia content. When the above executive body is the server providing the multimedia content playback service, the executive body may send the generated command to the client playing the current multimedia content. When the executive body is the client playing the multimedia content, the executive body may generate the command to execute skipping playing the current multimedia content and execute the command, thereby skipping playing the current multimedia content.

In practice, the executing the operation to skip playing the current multimedia content may be switching the play node to the end of the current multimedia content, or to the start playback point of the next multimedia content for playing, or may be continuing playing the current multimedia content for a preset time (for example, after 3 seconds), then switching the play node to the start playback point of a next multimedia content.

By recognizing a voice signal to obtain corresponding voice information, in response to detecting the voice signal sent by a user according to guidance information of a presented current multimedia content; then matching the voice information with template information corresponding to the guidance information as acquired; and generating a command to execute an operation to skip playing the current multimedia content, in response to determining successful matching the voice information and the template information corresponding to the guidance information, the method for playing multimedia content of the above embodiments of the present disclosure realizes the improvement of the multimedia content acquisition efficiency.

In some embodiments, the method for playing multimedia content may further include: acquiring play configuration information of the current multimedia content, the play configuration information including the guidance information of the current multimedia content, presentation mode information of the guidance information and the template information corresponding to the guidance information. Here, the play configuration information may be information configured when the multimedia content is created. The creator of the multimedia content may configure play configuration information for the multimedia content. Alternatively, the creator may configure multiple guidance information for the multimedia content, and configure presentation mode information of each guidance information and template information respectively corresponding to each guidance information. The guidance information may be, for example, a question-and-answer guide language including questions and answers, or may be, for example, a declarative guide language informing the user that the current multimedia content may be skipped by reading a certain sentence. The presentation mode information of the guidance information may be information for describing the presentation mode of the guidance information, and may include information such as a presentation time point, a presentation duration, a number of times of presentation, a time interval of repeated presentation (e.g., presented once every 20 seconds), a presentation position on the playback interface and a display style (for example, displayed in the form of a floating window) of the guidance information. When playing the current multimedia content, the corresponding play configuration information may be acquired according to an identifier of the current multimedia content.

In an exemplary scenario, after the user selects to play a certain video, the video server may insert an advertisement into and before the user's selected video for playing. Multiple guidance information may be configured for each advertisement, and a presentation mode and corresponding template information may be configured for each guide language. Here, the guidance information may be texts, pictures, videos, or audios, and the presentation mode may be, for example, a robot placard type, a text scroll type, a continuous presentation for 5 seconds, a presentation of every 10 seconds, and the like. When the user sends a voice instruction according to the guidance information, and the voice instruction matches the template information corresponding to the guidance information currently presented in the advertisement, the current advertisement may be skipped.

In some alternative implementations of the above embodiment, the guidance information and the template information corresponding to the guidance information may be determined through the following approach: analyzing the current multimedia content based on a preset multimedia content library to extract a key sentence contained in the multimedia content; defining the key sentence as the template information; and acquiring the corresponding guidance information configured for the key sentence.

The preset multimedia content library may include multiple multimedia contents. For example, in practice, the preset multimedia content library may be an advertisement bank containing multiple advertisements. The multimedia content in the preset multimedia content library may be analyzed, the key content of the multimedia content may be analyzed, and the key sentence contained in each multimedia content may be extracted using an analysis method based on the topic model or based on the text content. The key sentence may be used as the core information provided by the multimedia content, and may be the most informative sentence in the text content contained in the multimedia content that can best distinguish the multimedia content it represents from the information contained in other multimedia contents in the preset multimedia content library. The information entropy of each sentence contained in the multimedia content may also be calculated. The selection of the key sentence of the current multimedia content maybe performed in conjunction with the degree of difference or similarity with the key sentences of the other multimedia contents in the preset multimedia content library.

Further and alternatively, the preset multimedia content library may include multiple multimedia contents having preset key content identifiers. The key content identifier may be a tag used to characterize the core content in the multimedia content and may be pre-configured. For example, the key content identifier of the multimedia content of a video advertisement may be a brand name in the video advertisement. The above executive body may extract the key sentence contained in the multimedia content according to the following method: extracting a plurality of candidate sentences from a text content of the current multimedia content, determining a multimedia content having an identical key content identifier to the current multimedia content in the preset multimedia content library as an associated multimedia content of the current multimedia content, determining a multimedia content having a different key content identifier from the current multimedia content in the preset multimedia content library as a non-associated multimedia content of the current multimedia content, determining the number of the associated multimedia contents containing each candidate sentence and the number of the non-associated multimedia contents containing each candidate sentence; and determining the key sentence of the current multimedia content from the candidate sentences according to the number of the associated multimedia contents and the number of the non-associated multimedia contents containing each candidate sentence.

Specifically, when extracting the key sentence of a target multimedia content, a plurality of candidate sentences may be first extracted from the target multimedia content, for example, the text content of the target multimedia content may be simply segmented into a plurality of candidate sentences. The multimedia content in the preset multimedia content library may be divided into associated multimedia contents and non-associated multimedia contents based on whether the multimedia content in the preset multimedia content library is consistent with the key content identifier of the content of the target multimedia content. The number of the associated multimedia contents and the number of the non-associated multimedia contents containing each candidate sentence may then be counted. For each candidate sentence, the larger the number of the associated multimedia contents containing the candidate sentence and the smaller the number of the non-associated multimedia contents containing the candidate sentence, the greater the probability that the candidate sentence is determined as the key sentence of the target multimedia content. In a specific implementation, the difference between the number of the associated multimedia contents containing the candidate sentence and the number of the non-associated multimedia contents containing the candidate sentence may be taken as an importance index of the candidate sentence, and the candidate sentences are sorted in descending order based on the importance index. The candidate sentence sorted as the first is the key sentence of the target multimedia content.

For example, when extracting the key sentence of a video advertisement, a sentence in the video advertisement having an information entropy larger than a preset information entropy threshold may be used as a candidate sentence. Then, a first number of video advertisements containing each candidate sentence in the video advertisements of the same brand in the advertisement bank may be counted, and a second number of video advertisements containing each candidate sentence in the video advertisements of different brands may be counted. The difference between the first number and the second number of each candidate sentence is calculated, and the candidate sentence of the maximum difference between the first number and the second number is taken as the extracted key sentence.

Afterwards, the extracted key sentence may be used as the template information of the current multimedia content, and corresponding guidance information configured for the template information may then be acquired. That is, the extracted key sentence may be used as the template information for skipping playing the current multimedia content, and then a guide language may be configured according to the content of the template information to generate the guidance information corresponding to the template information. For example, when the extracted key sentence is the slogan of a certain brand, the guidance information may be configured as "what is our slogan."

Through the above extraction method of the key sentence, the key sentence that can distinguish multimedia contents having different key content identifiers may be extracted from the multimedia content, thus improving the distinguishing ability of the key sentence. Further, by guiding the user to send the voice instruction matched with the key sentence, the efficiency of the user of memorizing key information of the multimedia content may be improved. At the same time, the method may help the user to better distinguish the multimedia content from other multimedia contents.

In some alternative implementations of the above embodiment, the method for playing multimedia content may further include: in response to determining the user instruction text and the template information corresponding to the guidance information match successfully, generating first prompt information for prompting the user of successfully skipped the played current multimedia content. The first prompt information may have a pre-configured display mode. The display mode may include, for example, a preset position display of the playback interface, a preset display duration, a preset font, and the like. After the client playing the multimedia content acquires the first prompt information, it may display the first prompt information according to the pre-configured display mode to inform the user that the current played multimedia content have been successfully skipped.

In some alternative implementations of the above embodiment, the method for playing multimedia content may further include: in response to determining the user instruction text and the template information corresponding to the guidance information fail to match, generating second prompt information for prompting the user of not successfully skipped the played current multimedia content. When the user instruction text fails to match the above template information, the second prompt information may be generated. The second prompt information may also have a preset display mode. After the client playing the multimedia content acquires the second prompt information, it may display the second prompt information according to its corresponding display mode. Optionally, the second prompt information may also include a content of an operation for prompting the user to re-input a voice signal to trigger a skipping playing.

Alternatively, the first prompt information, the second prompt information, and the display modes of the first prompt information and the second prompt information may all be preset and contained in the play configuration information of the multimedia content. In this way, the first prompt information, the second prompt information and the display modes of the first prompt information and the second prompt information may be acquired through the above operation of acquiring the play configuration information of the multimedia content. When the user instruction text matches the template information successfully or fails to match, the corresponding first prompt information or second prompt information is extracted from the acquired play configuration information.

Through the above first prompt information and/or the second prompt information, the sense of immersion of the user in the interaction process may be further enhanced, which is conducive to improving the user's attention to the current multimedia content.

Figure 3:
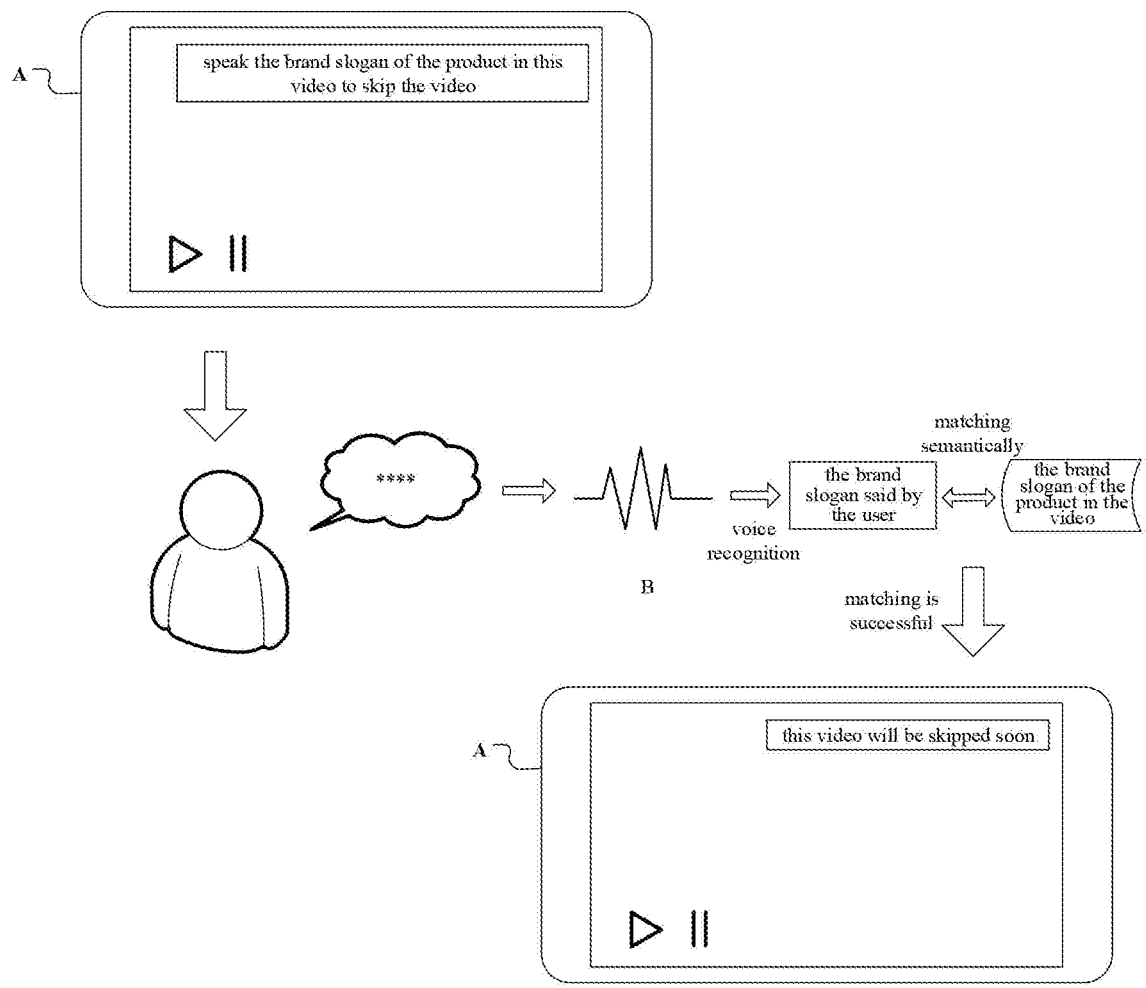
FIG. 3 is a schematic diagram of an application scenario of the method for playing multimedia content according to the present disclosure.

With reference to FIG. 3, a schematic diagram of an application scenario of the method for playing multimedia content according to the present disclosure is shown.

As shown in FIG. 3, when the terminal device A plays a video, the video interface may present the guide language "speak the brand slogan of the product in this video to skip the video" for prompting the user to skip the video. After noticing the guide language in the video, the user may speak the product name in accordance with the guide language. The terminal device A may detect the voice signal B sent by the user, analyze the brand slogan said by the user through voice recognition, and then match the brand slogan, i.e., the brand slogan of the product in the video, with the pre-acquired template information of the video. If the matching is successful, the first prompt information "this video will be skipped soon" may be generated and pushed to the user.

In the scenario of FIG. 3, if the brand slogan said by the user does not match the brand slogan of the product in the video, the second prompt "your statement is incorrect, please try again" may also be generated and pushed to the user.

Figure 4:
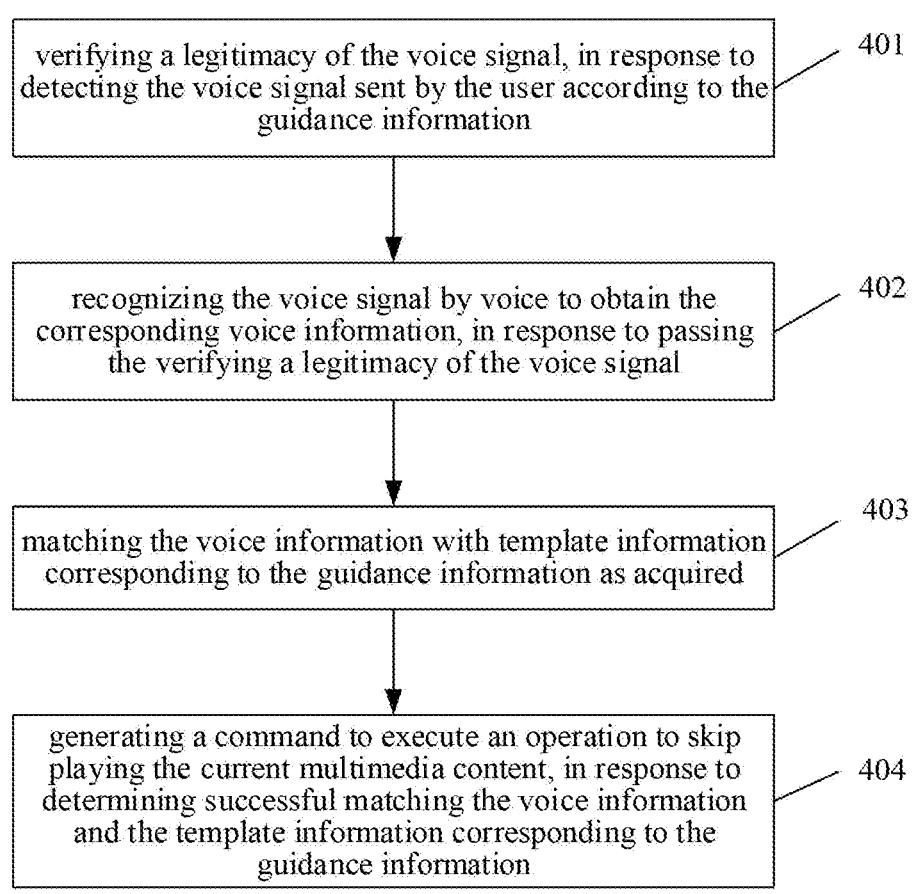
FIG. 4 is a flowchart of another embodiment of the method for playing multimedia content according to the present disclosure.

With further reference to FIG. 4, a flowchart of another embodiment of the method for playing multimedia content according to the present disclosure is shown. As shown in FIG. 4, the flow 400 of the method for playing multimedia content of the present embodiment includes the following steps:

In step 401, a legitimacy of the voice signal is verified, in response to detecting the voice signal sent by the user according to the guidance information of the presented current multimedia content.

In the present embodiment, the executive body of the method for playing multimedia content (for example, the terminal devices 101, 102, 103 or the server 105 as shown in FIG. 1) may detect whether a voice signal sent by the user is received, and determine whether the voice signal is sent according to guidance information of the presented current multimedia content. Here, the guidance information may be information in the form of text, voice, or the like for guiding the user to send a voice instruction to skip playing the current multimedia content. After it is determined that the voice signal is sent according to the guidance information, the voice signal and the legitimacy may be verified in various ways.

In a specific implementation, whether the intensity of the voice signal exceeds a preset intensity threshold may be checked, so as to determine whether the voice signal is sent by the user viewing the current multimedia content, and at the same time determine whether the intensity of the voice signal is large enough to ensure the accuracy of a voice recognition result. When the intensity of the voice signal is lower than the preset intensity threshold, it may be determined that the verification of the legitimacy of the voice signal fails.

In some alternative implementations of the present embodiment, the legitimacy of the voice signal may be verified by adopting the following method: in response to detecting the voice signal sent by the user according to the guidance information, acquiring security authentication information of a playback device and a user account used by the user for viewing the current multimedia content; authenticating the security authentication information of the playback device and the security authentication information of the user account; and in response to both the security authentication information of the playback device and the security authentication information of the user account being authenticated, determining the verification of the legitimacy of the voice signal.

Specifically, the security verification of the user identity may be performed through the security authentication information of the user account submitted when the user logs on. After the user logs on to the user account, an access token is acquired. The access token is the security authentication information of the user account. The server providing the multimedia content playback service or the client playing the multimedia content may verify the user's identity by accessing the access token, to verify the legitimacy of the voice signal. The security address of the playback device may include the network address, the device ID, and the SSL (Secure socket layer) certificate for security authentication between the playback device and the server providing the multimedia content playback service and the like of the playback device. The security of the playback device may be verified by the network address, the device ID, and the SSL certificate of the playback device, so as to verify the security of the voice signal received by the playback device. In this way, the bidirectional check between the client and the server may be guaranteed, preventing the server backend from not being able to play the multimedia content after being hijacked, thereby improving the security of the user interaction operation.

After the security authentication information of the playback device and the security authentication information of the user account are authenticated, the verification of the legitimacy of the voice signal may be determined; if at least one of the security authentication information of the playback device and the security authentication information of the user account fails the verification, it may be determined that the voice signal fails the legitimacy verification. Then, the above executive body may block the illegal voice signal, and does not perform the subsequent operations such as voice recognition.

In step 402, the voice signal is recognized by voice to obtain the corresponding voice information, in response to passing the verifying a legitimacy of the voice signal.

In the present embodiment, after the verification of the legitimacy of the voice signal, a feature extraction may be performed on the voice signal using voice, and semantic recognition and the like may be performed on the voice signal based on extracted features to obtain the corresponding voice information.

In step 403, the voice information is matched with template information corresponding to the guidance information as acquired.

Here, the template instruction may be pre-configured information. In the present embodiment, the matching of the voice information corresponding to the voice signal of the user and the template information corresponding to the acquired guidance information may be performed to determine whether the condition for skipping playing the current multimedia content is satisfied.

In step 404, a command is generated to execute an operation to skip playing the current multimedia content, in response to determining successful matching the voice information and the template information corresponding to the guidance information.

If the voice information and the template information corresponding to the guidance information match successfully in step 403, it may be determined that the condition for skipping playing the current multimedia content is satisfied, and the above executive body may generate a command to execute skipping playing the current multimedia content. When the above executive body is the server providing the multimedia content playback service, the executive body may send the generated command to the client playing the current multimedia content. When the executive body is the client playing the multimedia content, the executive body may generate a command to execute skipping playing the current multimedia content and skip playing the current multimedia content.

It needs to be noted that the operation of recognizing the voice signal to obtain the corresponding voice information in step 402, step 403, and step 404 in the flow 400 of the method for playing multimedia are respectively identical in specific implementations to the steps 201, 202, and 203 of the foregoing embodiment. The foregoing descriptions of the steps 201, 202, and 203 are also applicable to the operation of recognizing the voice signal by voice to obtain the corresponding user instruction text in step 402, step 403, and step 404.

In addition, the foregoing alternative implementations of the embodiment of the method for playing multimedia content shown in FIG. 2 may also be applied to the embodiment of the method for playing multimedia content shown in FIG. 4, and detailed description thereof will be omitted.

The method flow 400 of the method for playing multimedia content provided by the above embodiment of the present disclosure adds the step of verifying the legitimacy of the voice signal of the user based on the embodiment shown in FIG. 2, thereby improving the security protection performance of the user interaction operation in the process of playing the multimedia content.

Figure 5:
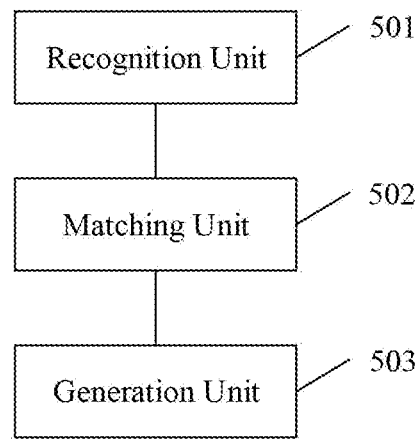
FIG. 5 is a schematic structural diagram of an apparatus for playing multimedia content according to the present disclosure.

With further reference to FIG. 5, as an implementation to the method shown in the above figures, the present disclosure provides an embodiment of an apparatus for playing multimedia content. The apparatus embodiment corresponds to the method embodiment shown in FIG. 2, and the apparatus may specifically be applied to various electronic devices.

As shown in FIG. 5, the apparatus 500 for playing multimedia content of the present embodiment includes: a recognition unit 501, a matching unit 502 and a generation unit 503. The recognition unit 501 may be configured to recognize a voice signal to obtain corresponding voice information, in response to detecting the voice signal sent by a user according to guidance information of a presented current multimedia content; the matching unit 502 maybe configured to match the voice information with template information corresponding to the guidance information as required; and the generation unit 503 may be configured to generate a command to execute an operation to skip playing the current multimedia content, in response to determining successful matching the voice information and the template information corresponding to the guidance information.

In the present embodiment, the recognition unit 501 may detect whether a voice signal sent by the user is received, and determine whether the voice signal is sent according to guidance information of a presented current multimedia content. After detected the voice signal sent by the user according to the guidance information of the presented current multimedia content, the voice signal may be analyzed to recognize voice information corresponding to the voice signal. The voice information may include: information for characterizing the voice characteristic of the voice signal and/or information for characterizing the semantics contained in the voice signal.

The matching unit 502 may adopt a plurality of methods to match the voice information obtained by the recognition unit 501 and the template information corresponding to the acquired guidance information. For example, it may directly match text contents of the voice information and the template information corresponding to the above guidance information. When the matching degree exceeds a preset matching degree threshold, it may be determined that the semantic matching of both sides is successful. For another example, a natural language processing method may be used to match the semantics of the voice information represented in text form or converted to feature vectors and the template information corresponding to the acquired guidance information.

The generation unit 503 may determine that the condition for skipping playing the current multimedia content is satisfied when the matching unit 502 determines the matching is successful, and further generate a command to execute an operation to skip playing the current multimedia content.

In some alternative implementations, the apparatus 500 may further include: an acquisition unit, configured to acquire play configuration information of the current multimedia content, the play configuration information including the guidance information of the current multimedia content, presentation mode information of the guidance information and the template information corresponding to the guidance information.

In some alternative implementations, the guidance information may be used to guide the user to send a voice instruction to skip playing the current multimedia content, and the template information includes a template instruction. The recognition unit 501 may be further configured to recognize the voice signal to obtain corresponding voice information through the following approach: convert the voice signal into a corresponding user instruction text; and the matching unit 502 may be further configured to match the voice information with template information corresponding to the guidance information as acquired through the following approach: match the user instruction text semantically with the template instruction corresponding to the guidance information as acquired.

In some alternative implementations, the guidance information and the template information corresponding to the guidance information may include guidance information and template information determined through the following approach: analyzing the current multimedia content based on a preset multimedia content library to extract a key sentence contained in the multimedia content; defining the key sentence as the template information; and acquiring corresponding guidance information configured for the key sentence.

In some alternative implementations, the preset multimedia content library includes a plurality of multimedia contents having key content identifiers; and a key sentence as the template information is extracted through the following approach: extracting a plurality of candidate sentences from a text content of the current multimedia content; determining a multimedia content having an identical key content identifier to the current multimedia content in the preset multimedia content library as an associated multimedia content of the current multimedia content; determining a multimedia content having a different key content identifier from the current multimedia content in the preset multimedia content library as a non-associated multimedia content of the current multimedia content; determining the number of the associated multimedia contents containing each candidate sentence and the number of the non-associated multimedia contents containing each candidate sentence; and determining the key sentence of the current multimedia content from the candidate sentences according to the number of the associated multimedia contents and the number of the non-associated multimedia contents containing each candidate sentence.

In some alternative implementations, the recognition unit 501 may be further configured to recognize the voice signal by voice to obtain corresponding voice information through the following approach: verify a legitimacy of the voice signal, in response to detecting the voice signal sent by the user according to the guidance information; and recognize the voice signal by voice to obtain the corresponding voice information, in response to passing the verifying of a legitimacy of the voice signal.

In some alternative implementations, the recognition unit 501 may be further configured to verify the legitimacy of the voice signal through the following approach: acquire security authentication information of a playback device and a user account used by the user for viewing the current multimedia content, in response to detecting the voice signal sent by the user according to the guidance information; authenticate the security authentication information of the playback device and the security authentication information of the user account; and determine the verification of the legitimacy of the voice signal, in response to passing the authenticating the security authentication information of the playback device and the security authentication information of the user account.

In some alternative implementations, the apparatus 500 may further include: a first prompt unit, configured to generate first prompt information for prompting the user of successfully skipping the played current multimedia content, in response to determining successful matching the voice information and the template information corresponding to the guidance information.

In some alternative implementations, the apparatus 500 may further include: a second prompt unit, configured to generate second prompt information for prompting the user of not successfully skipping the played current multimedia content, in response to determining unsuccessful matching the voice information and the template information corresponding to the guidance information.

The units described in the apparatus 500 correspond to the steps in the method described with reference to FIGS. 2 and 4. Thus, the operations and features described above for the method are equally applicable to the apparatus 500 and the units contained therein, and detailed descriptions thereof will be omitted.

The recognition unit recognizes a voice signal to obtain corresponding voice information, in response to detecting the voice signal sent by a user according to guidance information of a presented current multimedia content. The matching unit matches the voice information with template information corresponding to the guidance information as acquired. The generation unit generates a command to execute an operation to skip playing the current multimedia content, in response to determining successful matching the voice information and the template information corresponding to the guidance information. The apparatus for playing multimedia content of the above embodiments of the present disclosure realizes the improvement of the multimedia content acquisition efficiency.

Figure 6:
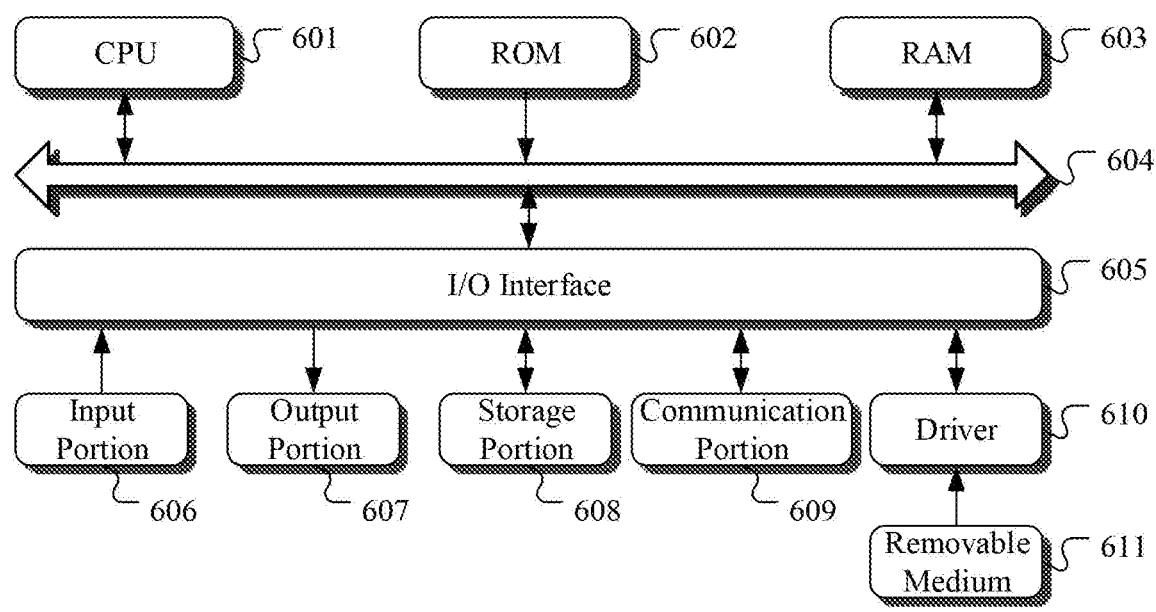
FIG. 6 is a schematic structural diagram of a computer system of a server adapted to implement the embodiments of the present disclosure.

Referring to FIG. 6, a schematic structural diagram of a computer system 600 adapted to implement an electronic device of the embodiments of the present application is shown. The electronic device shown in FIG. 6 is merely for illustrating, rather than limiting the function and using range of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application. It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a recognition unit, a matching unit, and a generation unit, where the names of these units or modules are not considered as a limitation to the units or modules. For example, the recognition unit may also be described as "a unit for recognizing a voice signal to obtain corresponding voice information, in response to detecting the voice signal sent by a user according to guidance information of a presented current multimedia content."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: recognize a voice signal to obtain corresponding voice information, in response to detecting the voice signal sent by a user according to guidance information of a presented current multimedia content; match the voice information with template information corresponding to the guidance information as acquired; and generate a command to execute an operation to skip playing the current multimedia content, in response to determining successful matching the voice information and the template information corresponding to the guidance information.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for playing multimedia content, comprising:
recognizing a voice signal to obtain corresponding voice information, in response to detecting the voice signal sent by a user according to guidance information of a presented current multimedia content;
matching the voice information with template information corresponding to the guidance information as acquired; and
generating a command to execute an operation to skip playing the current multimedia content, in response to determining successful matching the voice information and the template information corresponding to the guidance information;
wherein the guidance information and the template information corresponding to the guidance information comprise guidance information and template information determined through a following approach:

analyzing the current multimedia content based on a preset multimedia content library to extract a key sentence contained in the multimedia content;

defining the key sentence as the template information; and acquiring corresponding guidance information configured for the key sentence;

wherein the preset multimedia content library comprises a plurality of multimedia contents having key content identifiers; and the analyzing the current multimedia content based on a preset multimedia content library to extract a key sentence contained in the multimedia content comprises:

extracting a plurality of candidate sentences from a text content of the current multimedia content;

determining a multimedia content having an identical key content identifier to the current multimedia content in the preset multimedia content library as an associated multimedia content of the current multimedia content;

determining a multimedia content having a different key content identifier from the current multimedia content in the preset multimedia content library as a non-associated multimedia content of the current multimedia content;

determining a number of the associated multimedia contents containing each candidate sentence and a number of the non-associated multimedia contents containing each candidate sentence; and determining the key sentence of the current multimedia content from the candidate sentences according to the number of the associated multimedia contents and the number of the non-associated multimedia contents containing each candidate sentence.

2. The method according to claim 1, further comprising:

acquiring play configuration information of the current multimedia content, the play configuration information comprising the guidance information of the current multimedia content, presentation mode information of the guidance information and the template information corresponding to the guidance information.

3. The method according to claim 1, wherein the guidance information is used to guide the user to send a voice instruction to skip playing the current multimedia content, and the template information comprises a template instruction;

the recognizing the voice signal to obtain corresponding voice information, comprises:
converting the voice signal into a corresponding user instruction text; and the matching the voice information with template information corresponding to the guidance information as acquired, comprises:
matching the user instruction text semantically with the template instruction corresponding to the guidance information as acquired.

4. The method according to claim 1, wherein the recognizing a voice signal to obtain corresponding voice information, in response to detecting the voice signal sent by a user according to guidance information of a presented current multimedia content, comprises:

verifying a legitimacy of the voice signal, in response to detecting the voice signal sent by the user according to the guidance information; and recognizing the voice signal by voice to obtain the corresponding voice information, in response to passing the verifying a legitimacy of the voice signal.

5. The method according to claim 4, wherein the verifying a legitimacy of the voice signal, in response to detecting the voice signal sent by the user according to the guidance information, comprises:

acquiring security authentication information of a playback device and a user account used by the user for viewing the current multimedia content, in response to detecting the voice signal sent by the user according to the guidance information;

authenticating the security authentication information of the playback device and the security authentication information of the user account; and determining the verification of the legitimacy of the voice signal, in response to passing the authenticating the security authentication information of the playback device and the security authentication information of the user account.

6. The method according to claim 1, further comprising:

generating first prompt information for prompting the user of successfully skipping the played current multimedia content, in response to determining successful matching the voice information and the template information corresponding to the guidance information.

7. The method according to claim 1, further comprising:

generating second prompt information for prompting the user of not successfully skipping the played current multimedia content, in response to determining unsuccessful matching the voice information and the template information corresponding to the guidance information.

8. An apparatus for playing multimedia content, comprising:

at least one processor; and a memory storing instructions, which when executed by the at least one processor, cause the at least one processor to perform operations, the operations comprising:

recognizing a voice signal to obtain corresponding voice information, in response to detecting the voice signal sent by a user according to guidance information of a presented current multimedia content;

matching the voice information with template information corresponding to the guidance information as acquired; and generating a command to execute an operation to skip playing the current multimedia content, in response to determining successful matching the voice information and the template information corresponding to the guidance information;

wherein the guidance information and the template information corresponding to the guidance information comprise guidance information and template information determined through a following approach:

analyzing the current multimedia content based on a preset multimedia content library to extract a key sentence contained in the multimedia content;

defining the key sentence as the template information; and acquiring corresponding guidance information configured for the key sentence;

wherein the preset multimedia content library comprises a plurality of multimedia contents having key content identifiers; and the analyzing the current multimedia content based on a preset multimedia content library to extract a key sentence contained in the multimedia content comprises:

extracting a plurality of candidate sentences from a text content of the current multimedia content;

determining a multimedia content having an identical key content identifier to the current multimedia content in the preset multimedia content library as an associated multimedia content of the current multimedia content;

determining a multimedia content having a different key content identifier from the current multimedia content in the preset multimedia content library as a non-associated multimedia content of the current multimedia content;

determining a number of the associated multimedia contents containing each candidate sentence and a number of the non-associated multimedia contents containing each candidate sentence; and determining the key sentence of the current multimedia content from the candidate sentences according to the number of the associated multimedia contents and the number of the non-associated multimedia contents containing each candidate sentence.

9. The apparatus according to claim 8, further comprising:

acquiring play configuration information of the current multimedia content, the play configuration information comprising the guidance information of the current multimedia content, presentation mode information of the guidance information and the template information corresponding to the guidance information.

10. The apparatus according to claim 8, wherein the guidance information is used to guide the user to send a voice instruction to skip playing the current multimedia content, and the template information comprises a template instruction;

the recognizing the voice signal to obtain corresponding voice information, comprises:

converting the voice signal into a corresponding user instruction text; and the matching the voice information with template information corresponding to the guidance information as acquired, comprises:

matching the user instruction text semantically with the template instruction corresponding to the guidance information as acquired.

11. The apparatus according to claim 8, wherein the recognizing a voice signal to obtain corresponding voice information, in response to detecting the voice signal sent by a user according to guidance information of a presented current multimedia content, comprises:

verifying a legitimacy of the voice signal, in response to detecting the voice signal sent by the user according to the guidance information; and recognizing the voice signal by voice to obtain the corresponding voice information, in response to passing the verifying of a legitimacy of the voice signal.

12. The apparatus according to claim 11, wherein the verifying a legitimacy of the voice signal, in response to detecting the voice signal sent by the user according to the guidance information, comprises:

acquiring security authentication information of a playback device and a user account used by the user for viewing the current multimedia content, in response to detecting the voice signal sent by the user according to the guidance information;

authenticating the security authentication information of the playback device and the security authentication information of the user account; and determining the verification of the legitimacy of the voice signal, in response to passing the authenticating the security authentication information of the playback device and the security authentication information of the user account.

13. The apparatus according to claim 8, further comprising:

generating first prompt information for prompting the user of successfully skipping the played current multimedia content, in response to determining successful matching the voice information and the template information corresponding to the guidance information.

14. The apparatus according to claim 8, further comprising:

generating second prompt information for prompting the user of not successfully skipping the played current multimedia content, in response to determining unsuccessful matching the voice information and the template information corresponding to the guidance information.

15. A non-transitory computer readable storage medium, storing a computer program thereon, the computer program, when executed by a processor, causes the processor to perform operations, the operations comprising:

recognizing a voice signal to obtain corresponding voice information, in response to detecting the voice signal sent by a user according to guidance information of a presented current multimedia content;

matching the voice information with template information corresponding to the guidance information as acquired; and generating a command to execute an operation to skip playing the current multimedia content, in response to determining successful matching the voice information and the template information corresponding to the guidance information;

wherein the guidance information and the template information corresponding to the guidance information comprise guidance information and template information determined through a following approach:

analyzing the current multimedia content based on a preset multimedia content library to extract a key sentence contained in the multimedia content;

defining the key sentence as the template information; and acquiring corresponding guidance information configured for the key sentence;

wherein the preset multimedia content library comprises a plurality of multimedia contents having key content identifiers; and the analyzing the current multimedia content based on a preset multimedia content library to extract a key sentence contained in the multimedia content comprises:

extracting a plurality of candidate sentences from a text content of the current multimedia content;

determining a multimedia content having an identical key content identifier to the current multimedia content in the preset multimedia content library as an associated multimedia content of the current multimedia content;

determining a multimedia content having a different key content identifier from the current multimedia content in the preset multimedia content library as a non-associated multimedia content of the current multimedia content;

determining a number of the associated multimedia contents containing each candidate sentence and a number of the non-associated multimedia contents containing each candidate sentence; and determining the key sentence of the current multimedia content from the candidate sentences according to the number of the associated multimedia contents and the number of the non-associated multimedia contents containing each candidate sentence.

* * * * *